US008679384B2

(12) United States Patent
Foster et al.

(10) Patent No.: US 8,679,384 B2
(45) Date of Patent: Mar. 25, 2014

(54) INTUMESCENT WEATHERSEAL

(71) Applicant: Schlegel Systems Inc., Rochester, NY (US)

(72) Inventors: Mark D. Foster, Pittsford, NY (US); Craig W. Lund, Lima, NY (US)

(73) Assignee: Schlegel Systems Inc., Rochester, NY (US)

( * ) Notice: Subject to any disclaimer, the term of this patent is extended or adjusted under 35 U.S.C. 154(b) by 0 days.

(21) Appl. No.: 13/944,016

(22) Filed: Jul. 17, 2013

(65) Prior Publication Data

US 2014/0015156 A1    Jan. 16, 2014

Related U.S. Application Data

(62) Division of application No. 12/844,316, filed on Jul. 27, 2010, now Pat. No. 8,510,996.

(60) Provisional application No. 61/228,713, filed on Jul. 27, 2009.

(51) Int. Cl.
*B29C 65/00* (2006.01)

(52) U.S. Cl.
USPC ............................................ 264/46.5; 156/78

(58) Field of Classification Search
USPC .............. 49/475.1, 489.1, 490.1, 496.1; 264/45.3, 46.7, 259, 271.1, 279, 279.1, 264/219, 225, 45.8, 31, 35, 46.5, 46.4, 41, 264/45.1; 156/77, 78, 79

See application file for complete search history.

(56) References Cited

U.S. PATENT DOCUMENTS

| | | | | |
|---|---|---|---|---|
| 3,615,972 A | * | 10/1971 | Morehouse et al. | 156/79 |
| 4,015,386 A | * | 4/1977 | Cook | 52/232 |
| 4,156,533 A | | 5/1979 | Close et al. | |
| 4,315,080 A | * | 2/1982 | Gagliani et al. | 521/189 |
| 4,328,273 A | | 5/1982 | Yackiw | |
| 4,361,453 A | * | 11/1982 | Gagliani et al. | 156/79 |
| 4,422,988 A | * | 12/1983 | Kornylak | 264/40.3 |
| 4,656,785 A | | 4/1987 | Yackiw | |
| 4,660,338 A | | 4/1987 | Wagner | |
| 4,676,025 A | | 6/1987 | Mattscheck et al. | |
| 4,784,902 A | | 11/1988 | Crompton | |

(Continued)

FOREIGN PATENT DOCUMENTS

| | | |
|---|---|---|
| CN | 201125658 | 10/2008 |
| EP | 745751 A2 | 12/1996 |

(Continued)

OTHER PUBLICATIONS

Combined Search and Examination Report for GB1012560.7 dated Nov. 15, 2010, 9 pages.

*Primary Examiner* — Jerry Redman
(74) *Attorney, Agent, or Firm* — Goodwin Procter LLP (57) ABSTRACT

A weatherseal adapted to be installed in a door or window opening includes a spine, a resilient foam core, an intumescent material, and a liner. The spine has first and second ends, the first end adapted for mounting the weatherseal to the door or window opening. The resilient foam core is attached to the spine, proximate the second end of the spine. The intumescent material is arranged proximate the foam core. The liner encloses the flexible foam core and the intumescent material. The weatherseal or a portion may be color-coded to identify the weatherseal for fire rated applications.

6 Claims, 10 Drawing Sheets

(56) References Cited

U.S. PATENT DOCUMENTS

| | | |
|---|---|---|
| 5,279,087 A | 1/1994 | Mann |
| 5,374,383 A * | 12/1994 | Brambach .................. 264/46.5 |
| 5,759,659 A | 6/1998 | Sanocki et al. |
| 5,943,825 A | 8/1999 | Procton et al. |
| 7,451,714 B1 | 11/2008 | Redfern et al. |
| 7,790,076 B2 * | 9/2010 | Seiter et al. .................. 264/41 |
| 8,225,553 B1 | 7/2012 | Redfern et al. |
| 8,510,996 B2 * | 8/2013 | Foster et al. .............. 49/489.1 |
| 2002/0113377 A1 | 8/2002 | Mann |
| 2008/0216411 A1 | 9/2008 | Okajima et al. |
| 2009/0313900 A1 | 12/2009 | Foster |
| 2010/0032856 A1 * | 2/2010 | Hahn et al. .................. 264/41 |
| 2010/0310833 A1 * | 12/2010 | Scherzer et al. ............ 428/182 |
| 2012/0270052 A1 * | 10/2012 | Nehls et al. ................. 428/404 |

FOREIGN PATENT DOCUMENTS

| | | |
|---|---|---|
| EP | 2103769 A2 | 9/2009 |
| FR | 2396648 A1 | 2/1979 |
| GB | 2212539 A | 7/1989 |
| GB | 2222194 A | 2/1990 |
| GB | 2356885 A | 6/2001 |
| WO | WO-9922107 A1 | 5/1999 |
| WO | WO-03064801 A1 | 8/2003 |

* cited by examiner

INTUMESCENT WEATHERSEAL

CROSS-REFERENCE TO RELATED APPLICATIONS

This Application is a divisional application of U.S. patent application Ser. No. 12/844,316 filed on Jul. 27, 2010, now U.S. Pat. No. 8,510,996, which claims priority to and the benefit of U.S. provisional patent application Ser. No. 61/228,713, filed Jul. 27, 2009, the disclosures of which are hereby being incorporated herein by reference in their entireties.

FIELD OF THE INVENTION

The present invention relates to weatherseals. More particularly, the present invention relates to weatherseals that include an intumescent material.

BACKGROUND OF THE INVENTION

Foam weatherseals (weather stripping) are well known in the art as a way of preventing water, air and/or other unwanted contaminants from seeping past a closed door, window, or the like. More specifically, a weatherseal is generally applied to a door jamb or window frame for contact with the respective door or window when closed. A typical weatherseal can have a complex geometric profile and is typically manufactured in continuous or cut lengths to provide a seal between the door or window and associated jamb. Conventional weatherseals typically consist of a foam profile attached to a rubber or plastic extrusion and are usually attached to a door or window frame by inserting a portion of the extrusion into a door or window kerf. Alternatively, the weatherseal may be attached to a door jamb, window frame or other component using adhesive tape, fasteners, or the like.

Conventional weatherseals, while being effective at preventing the passage of water and other contaminants, are generally not effective at slowing spread of a fire and/or smoke around the closed door or window.

Intumescent materials are known to help retard the spread of fires. Specifically, intumescent materials swell when exposed to the elevated temperatures caused by a fire. When swollen, the materials are poor conductors of heat, and thus slow the spread of the fire. Intumescents may also include hydrates, that release water vapor at elevated temperatures, to also slow the spread of the fire.

Some known applications incorporate intumescent materials and weatherseals. For example, U.S. Pat. No. 4,676,025 shows a remotely activatable seal that incorporates an intumescent bead of material that is activated by a heat source (i.e., coiled high resistance wire) disposed in the intumescent material. However, there are a variety of potential problems for such a seal, since the high resistance wire must be activated by some alarm condition, requiring a control system, as well as a reliable power source. It is contemplated that the electrical current and power required to activate initially and fully the intumescent material may not be available in an emergency. Moreover, there may be a reliability concern. Repeated opening and closing of the door, window, etc. being sealed and resultant flexing of the embedded high resistance wire and associated external wiring may compromise the wiring or cause an open circuit condition, making the remote, early activation of the intumescent portion of the seal ineffective. The intumescent bead is also encased fully within the resilient cellular foam core. Accordingly, when installed in a door frame or other opening, the intumescent bead of the weatherseal does not have direct contact against the door jamb or frame. Accordingly, when activated, the intumescent material could expand unevenly, in a relatively uncontrolled manner, creating gaps around the door slab. Flame and smoke could breach the door slab and frame, rendering the seal unsatisfactory for its intended purpose.

Moreover, this prior art seal would be relatively expensive to manufacture and install, since it requires the inclusion of the high resistance wire coil within the seals and interconnecting the coils with external wiring and a control/power supply external to the seals.

There is a need in the art for an easily and inexpensively manufactured weatherseal that is capable of sealing a door, window, or the like during normal, i.e., non-fire, operating conditions, but that also retards the spread of a fire beyond the closure. Further, there is a need in the art to be able to install such weatherseals in a manner consistent with non-intumescent seals, without the need to electrically interconnect the seals to each other or to an external control/power supply.

SUMMARY OF THE INVENTION

The present invention addresses the foregoing needs in the art by providing an improved intumescent weatherseal and a method of making such a seal.

According to one aspect of the invention, a weatherseal adapted to be installed in a door or window includes in one embodiment a spine, a resilient foam core, an intumescent material, and a liner. The spine has first and second ends, the first end adapted for mounting the weatherseal to the door or window opening. The resilient foam core is attached to the spine, proximate the second end of the spine. The intumescent material is arranged proximate the foam core. The liner encloses the flexible foam core and the intumescent material.

In one embodiment, an intumescent weatherseal adapted to be installed in a door or window opening includes a spine having first and second ends, the first end adapted for mounting the weatherseal in the opening with a resilient foam core attached to the spine, proximate the second end of the spine. An intumescent material is arranged proximate an edge of the weatherseal, adapted to abut structure when installed in the opening. A liner encloses the resilient foam core and the intumescent material. The resilient foam core, the intumescent material, and the liner can be configured to form a substantially V-shaped flexible seal, with a support leg proximate the spine and a sealing leg depending angularly from the support leg. The intumescent material is disposed in at least one of the support leg and the sealing leg. In one embodiment, the intumescent material is formed in the support leg and extends along a side of the support leg disposed outside the V-shape. The foam core can be either an open cell foam or a closed cell foam, for example polyether urethane. In various embodiments, one or more flexible fins can depend from the spine. Alternatively or additionally, the liner can include a weakened portion proximate the intumescent material, such as a series of perforations, a material having a melting point substantially at or less than an activation temperature of the intumescent material, or be made of a more flexible material.

In another embodiment, an intumescent weatherseal adapted to be installed in a door or window opening includes an intumescent material arranged proximate an edge of the weatherseal, adapted to abut structure when installed in the opening. A sealing material can be arranged proximate the intumescent material, and structure is provided for attaching the weatherseal in the opening. At least a portion of the weatherseal, such as, but not limited to, an exposed portion of the spine, may include coloring coding. The color coding may include, or consist essentially of, a red coloring.

In another aspect, the present invention provides a method of forming a weatherseal. The method includes, in one embodiment, providing a liner, pouring a reacting foam mass onto a side of the liner, and inserting the liner with foam mass thereon into a mold. Concurrent with inserting the liner into the mold, a spine is inserted into the mold and an intumescent material is inserted into the mold. The method also includes maintaining the liner with the foam mass thereon, the spine, and the intumescent material in the mold for a time sufficient for the reacting foam mass to expand. The expansion of the foam can be constrained by the mold to shape the weatherseal. Optionally, the method includes supplying an adhesive to the liner to aid in bonding the liner with at least one of the spine, the foam mass, and the intumescent strip. In various embodiments, the method can produce a weatherseal that is substantially V-shaped. The foam mass can include an adhesive that binds at least one of the liner, the spine, and the intumescent material thereto. The method can also include a curing step, of curing the reacting foam mass to stop expansion of the reacting foam mass.

These and other aspects, objects, and features of the invention may be appreciated with reference to the accompanied detailed description of the invention and figures, which describe and illustrate preferred embodiments of the present invention.

DETAILED DESCRIPTION OF THE INVENTION

Figure 1A:
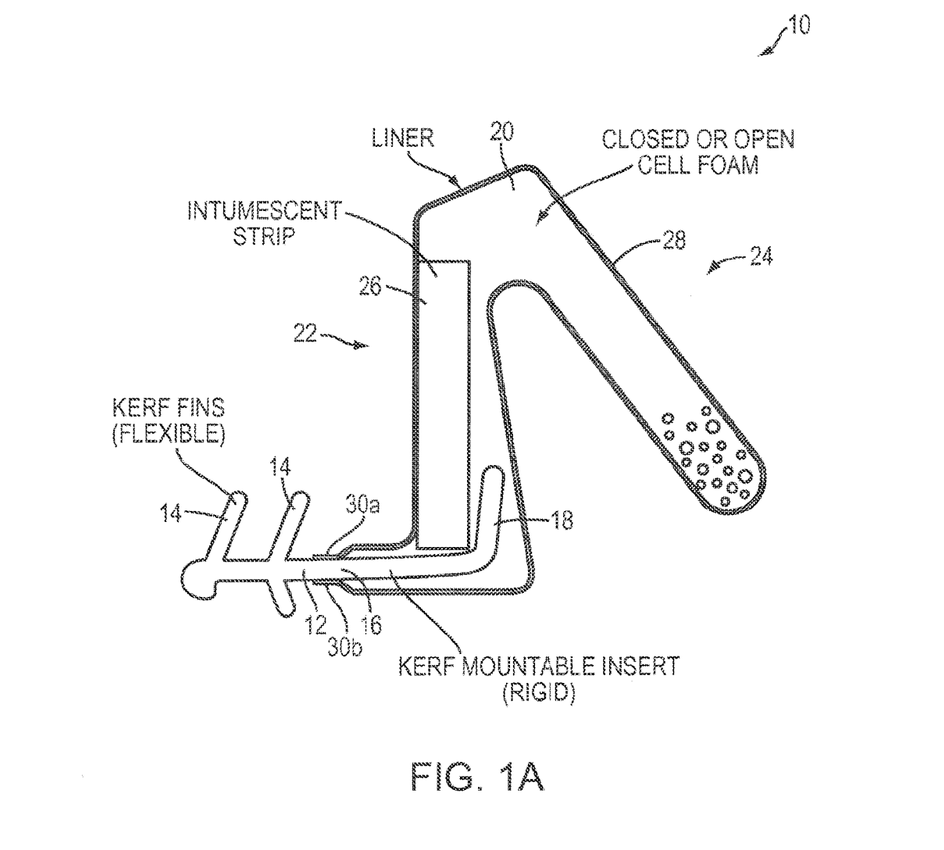
FIG. 1A is a cross-section of a weatherseal having an intumescent material arranged proximate a spine of the weatherseal, according to a first embodiment of the present invention.
Figure 1B:
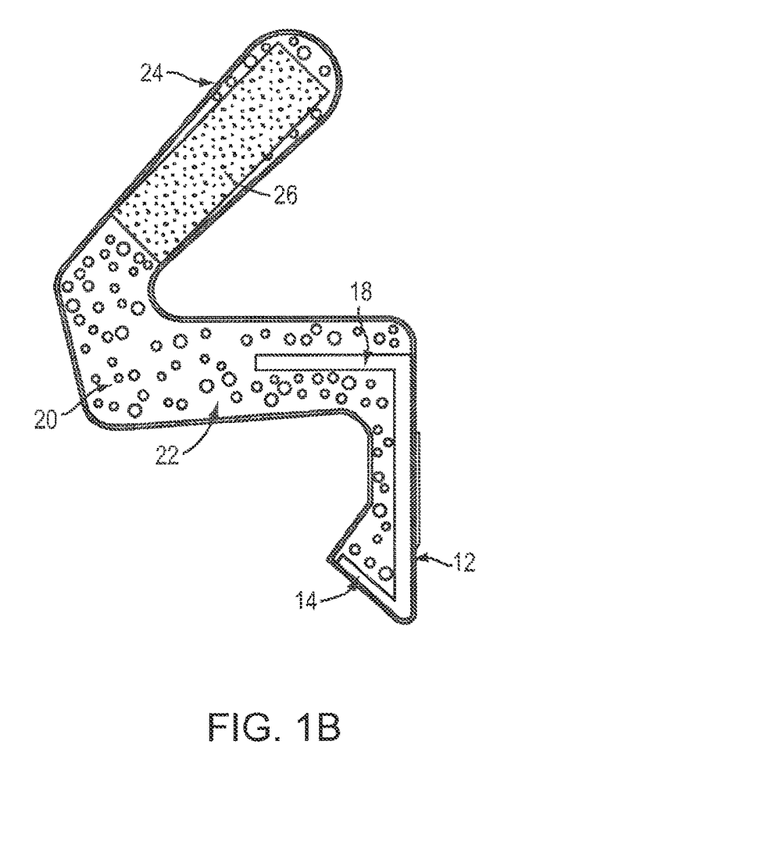
FIG. 1B is a cross-section of a weatherseal having an intumescent material forming part of a foam sealing leg of the weatherseal, according to another embodiment of the present invention.
Figure 2:
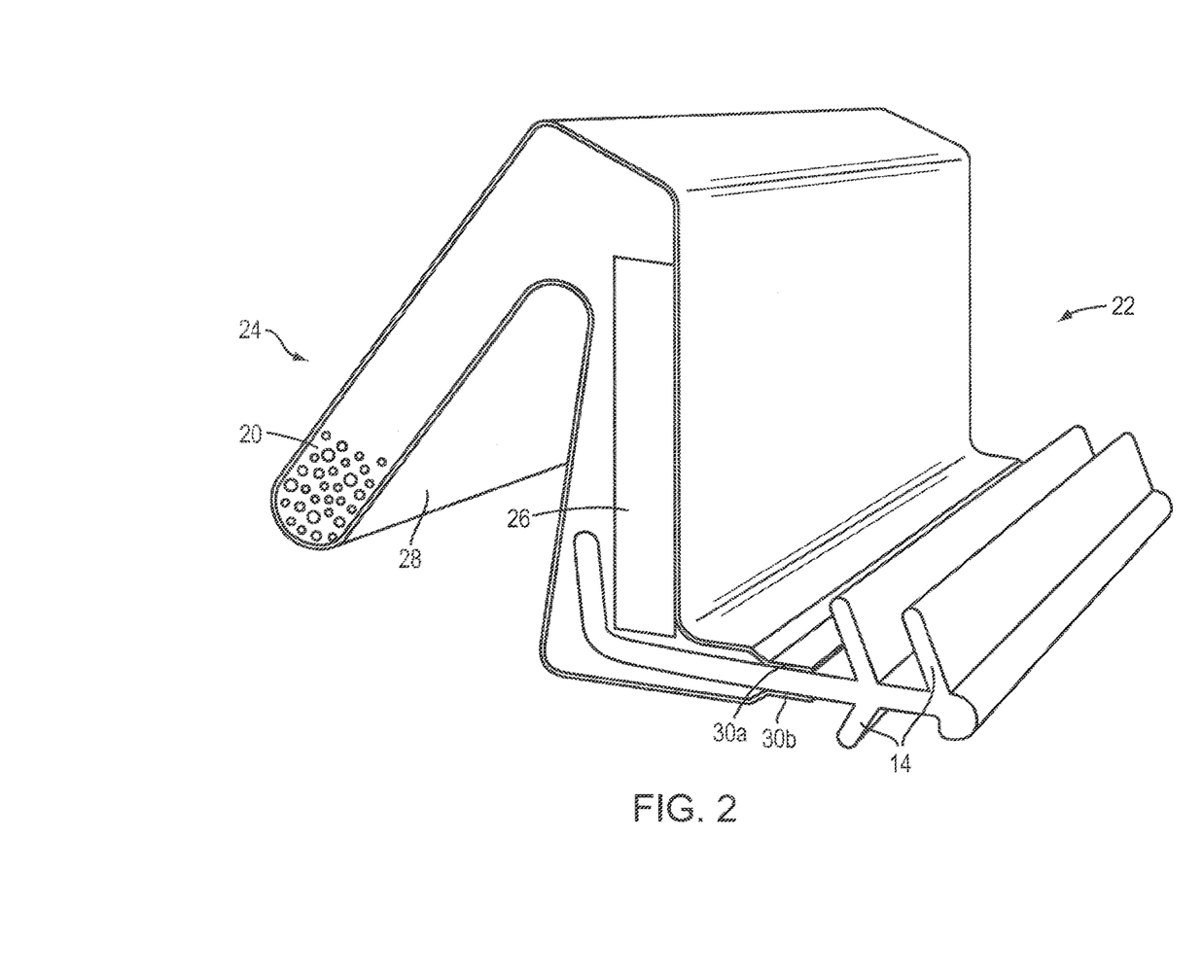
FIG. 2 is a perspective view of the weatherseal illustrated in FIG. 1A.

FIGS. 1A, 1B, and 2 illustrate a weatherseal 10 in accordance with one embodiment of this invention. The weatherseal includes a spine 12 having a plurality of flexible fins 14 extending from one end thereof for engaging a kerf cut in a door or window frame. The spine 12 is generally straight or L-shaped and has a base portion 16 from which the flexible fins 14 extend and a foot 18 extending at approximately a right angle from the base portion 16 for supporting the remainder of the door seal 10. The spine 12 can be made from extruded molded plastic, such as polypropylene, and is semi-rigid. The spine 12 can be sufficiently stiff to support the door seal but flexible enough to allow it to be inserted into a kerf in a door frame and to accommodate manufacturing imperfections and geometric variability in the width and depth of the kerf. The fins 14 can be the same material as the spine 12 or preferably can be made of polypropylene and can be more flexible than the spine 12. The fins 14 are sufficiently flexible to retain the spine 12 in the kerf. To this end, the fins 14 and the spine 12 may be formed of different materials, or from different types of the same material, e.g., polypropylene.

The spine 12 and fins 14 are not necessarily made of polypropylene, however. They could be made of any thermoplastic. Such materials may be extruded or otherwise molded, and could include PVC, polyethylene, nylon, urethane, polyester, polycarbonate, or any combination of these materials. The spine 12 (and fins 14) can be formed as a continuous length, by extrusion or coextrusion, for example. In one embodiment, the spine 12 (and fins 14), or portions thereof, may have a color concentrate (e.g., "red" coloring polymer) added thereto during the formation process. Alternatively, a colored coating may be added to spine 12 (and fins 14), or portions thereof, after formation. Providing a red coloring, or other color coding, to at least the exposed portion of the spine 12 or any other portion or the entirety of the weatherseal is advantageous, for example, in providing an identifying mark to a purchaser or an installer of the weatherseal to identify the weatherseal as having fire retarding properties.

A foam core or profile 20 is attached to the foot 18 of the spine 12. In this embodiment, the foam core 20 has a generally V-shaped configuration and includes a support leg 22 enveloping the foot of the spine and a sealing leg 24 adapted to engage the moving portion of a door or window when the seal is used. The foam profile 20 can be formed from open or closed cell foam, such as polyether urethane. In one embodiment, the foam is a high resiliency TDI-based polyether urethane foam. Alternative foam compositions include MDI/TDI blends, polyester/polyether blends or EVAs. Of course, the invention is not limited to this foam. Other foams include thermoplastic polyolefins, thermoplastic vulcanizates, strenic thermoplastic elastomers, PVC compounds, and combinations and subclasses of such foams. Alternatively, the foam core 20 could be formed from an alternative material such as foamed rubber, including but not limited to one or more of silicone, neoprene, nitrile, SBR, and EPDM. The foam core material can generally be chosen based on the manufacturing process and desired characteristics for the part, such as density, durometer, compression set, cost, etc.

An intumescent material 26 can be arranged proximate the foam core 20 in one embodiment, forming a portion of the V-shaped profile, as shown in FIG. 1A. The intumescent material 26 can be provided as a strip and forms, along with a portion of the foam core 20, a portion of the support leg 22 of the V-shaped profile. In this embodiment, the intumescent material is arranged at an outer surface (relative to the V-shape) of the support leg 24. In this manner, the intumescent material is disposed proximate the window or door frame in which the kerf is formed. Of course, there will, in certain embodiments, be liner and potentially spine disposed between the intumescent material and the structure when installed. In another embodiment, the intumescent material 26 could form part or all of the sealing leg 24, as shown in FIG. 1B. In that embodiment, the intumescent material 26 could be arranged closer to the window sash or door. In other alternative embodiments, the intumescent material 26 could be disposed in both the sealing and support legs 24, 22. By positioning the intumescent material 26 against an optional seal liner 28 and, accordingly, in the clearance gap against the structure being sealed (e.g., such as the door jamb, frame, or door slab, instead of in some other portion of the seal), even intumescent action all around the door jamb and door slab is ensured. Accordingly, even if a portion of the weatherseal were to fail, due to exposure to elevated temperatures or flames, the location of the intumescent material 26, in the clearance gap between the door frame and the door slab (e.g., surrounded by fenestration structure on three sides or at least two parallel spaced sides), ensures an optimal protective scheme. This is typically a better configuration than, for example, providing the intumescent material 26 in an area such as an inside corner, bounded by fenestration structure on only two adjacent sides.

The intumescent material may be an exfoliating graphite-based material, such as that described in U.S. Pat. No. 6,207,085 the disclosure of which is incorporated herein by reference in its entirety. This type of material is fully air and water stable, which is useful in sealing applications, where the seal is likely to be exposed to such elements. One embodiment of the invention includes a Thermaflex 2 mm graphite intumescent seal provided by Firewise Supplies, Ltd, of Cambridge, UK. Other possible graphite-based intumescent seals include, for example, graphite impregnated paper-type seals provided by Intumescent Systems Ltd of Dover, UK, under the tradename Envirograf®. Any suitable graphite or glass filled intumescent material or the like may be used.

However, other intumescent materials can be used that are not air and water stable. In such embodiments, the intumescent material may be covered to shield the material from the elements. For example, a protective coating, such as the liner 28 described below, may shield the intumescent material from the elements. In another embodiment, the intumescent material could be embedded in the foam core, such that the foam core acts to shield the intumescent material. A relatively small amount of intumescent material can plug a much larger gap. For example, in one embodiment, the intumescent material strip can have a rectangular cross-section on the order of about 2 mm by 10 mm and exhibit an expansion ratio of greater than about 20:1 or of greater than about 30:1, such as about 37:1. By using a pre-formed, cured intumescent strip of material, there is no need to accommodate any drying or curing of the intumescent material, that might otherwise be required to manufacture the weatherseal, as discussed in more detail below. Further, the placement and cross-sectional size and extent of the intumescent material in the weatherseal can be readily controlled.

In one embodiment the intumescent material may include, or consist essentially of, ammonium phosphate or sodium silicate. In alternative embodiments, other forms of intumescent materials may be used including, but not limited to, intumescent putty or caulks that can be pumped or dispensed in the appropriate location into the part during manufacture. Note, however, that certain silicate type and other types of intumescent materials provided in putty or caulk form can contain oils or solvents that are not necessarily compatible with the other materials typically used in weatherseals. Additionally, in such embodiments, appropriate curing of the putty or caulks in the finished weatherseal should be considered. For example, a fully encapsulating liner and/or closed cell foam profile can inhibited the oils and solvents from evaporating, thereby preventing curing of the intumescent material within a reasonable time frame. In these alternative embodiments, some form of internal venting in the weatherseal can be provided, so that the intumescent material need not be provided in strip form.

In another embodiment, the foam body 20 and the intumescent material 26 are surrounded by the liner 28 having two edges 30a, 30b attached to upper and lower surfaces of the base portion 16 of the spine 12 by an adhesive, ultrasonic welding or some other suitable attachment technique. The liner 28 can be made from a film material formed from polyethylene or the like that can be directly bonded to the surface of the spine 12. Other liner materials include any flexible film including, but not limited to, PVC, polyurethane, polyester, polypropylene, EVAs, polyimides, coated fabrics and laminated structures of films, films and fabrics, and films and metal foils. Alternatively, the liner 28 could be formed from a liquid coating, as described, for example, in U.S. Pat. No. 5,192,586, the disclosure of which is herein incorporated by reference in its entirety.

As illustrated in FIG. 1, the liner 28 in this embodiment contacts both the intumescent strip 26 and the foam core 20. However, the intumescent strip 26 may alternatively only contact the foam material, for example, if the intumescent strip 26 is completely embedded in the foam core 20.

In use, the spine 12 is inserted into a kerf in the frame of the closure to be sealed, and the support leg 22 of the seal 10 contacts the frame. In the illustrated embodiment, the intumescent strip 26 is thus arranged next to the frame of the closure. The sealing leg 24 extends from the support leg 22 such that when the closure is closed, the closure contacts the sealing leg 24 and biases the sealing leg 24 toward (and typically into contact with) the support leg 22. The combination of the support and sealing legs 22, 24 seals any gap between the frame and closure to preclude passage of contaminants therethrough. When excessive heat is introduced, i.e., heat resulting from a fire and exceeding activation temperature of the intumescent, the intumescent strip responds by expanding, further filling and sealing the gap, thereby slowing the spread of the fire and smoke past the closure.

The liner 28 covering the intumescent material 26 can be designed advantageously so as not to preclude expansion of the intumescent material 26. For example, the liner 28 can includes a weakened portion proximate the intumescent material 26. This weakened portion may have sufficient flexibility that it stretches as the intumescent material 26 expands. Alternatively, the weakened portion may have a melting point approximately the same as or lower than the temperature needed to activate the intumescent. In this arrangement, the liner 28 melts, so as to not inhibit expansion of the intumescent material 26. Of course, the composition of the weakened portion may be the same as the composition of the entirety of the liner 28.

Figure 3:
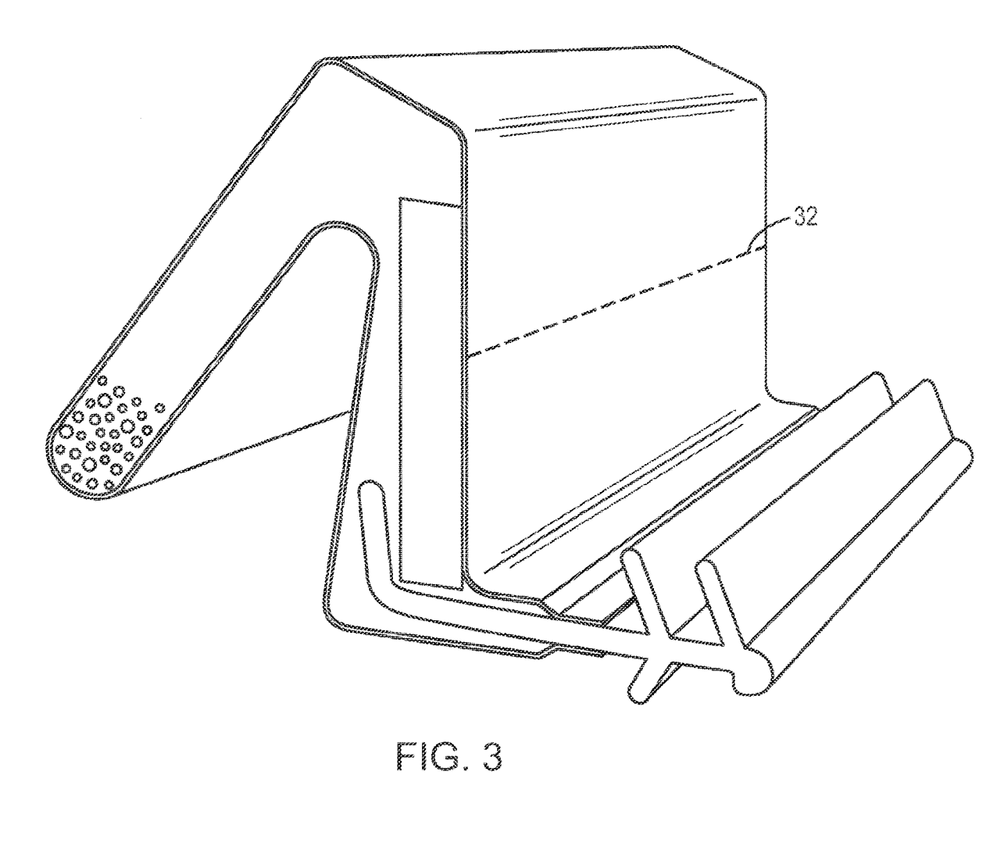
FIG. 3 is a perspective view of a weatherseal according to another embodiment of the invention.

In another embodiment, illustrated in FIG. 3, the weakened portion of the liner is an area including a series of perforations 32. In the event of a fire, the liner tears at the perforation 32 in response to pressure from the expanding intumescent material. Alternatively, the weakened portion could include a thinner layer that would easily tear under internal pressure. Other structures for the weakened portion of the liner will be apparent based on the foregoing description.

According to one method of forming the weatherseal 10 with intumescent material, a continuous, flat length of the liner is conveyed along a conveyance direction. A reacting foam mass is poured onto the liner and the liner with foam mass thereon is guided into a moving mold. The spine, provided as a continuous length, and the intumescent strip, also provided as a continuous length, are guided into the moving mold concurrently and independently of each other and the liner, also along the conveyance direction. The moving mold wraps the liner around the foam mass, intumescent strip, and insert. Once properly formed, the ends of the liner are affixed to the insert. The reacting foam mass expands to form the V-shape described above. The reacting foam mass may include an adhesive property that acts to bond the liner, insert and intumescent strip together, resulting in the seal described above. Alternatively, or in addition, portions of the inner surface of the liner may be coated with an adhesive to aid in forming the seal. As the completed seal emerges from the moving mold, it may be cut to length using known methods. Accordingly, this method of manufacture is a continuous process, utilizing a continuous mold cap and a continuous mold base, for example of the endless belt variety known to those skilled in the art. The foaming mixture is poured onto the liner in a liquid state, with the insert, liner and intumescent material all being brought together, folded, and constrained within the mold base and cap, while the foam mixture expands and sets. After emerging from the belt mold and being coiled or cut to length, the weatherseal 10 can optionally be introduced into a oven at elevated temperature for curing.

Figure 7:
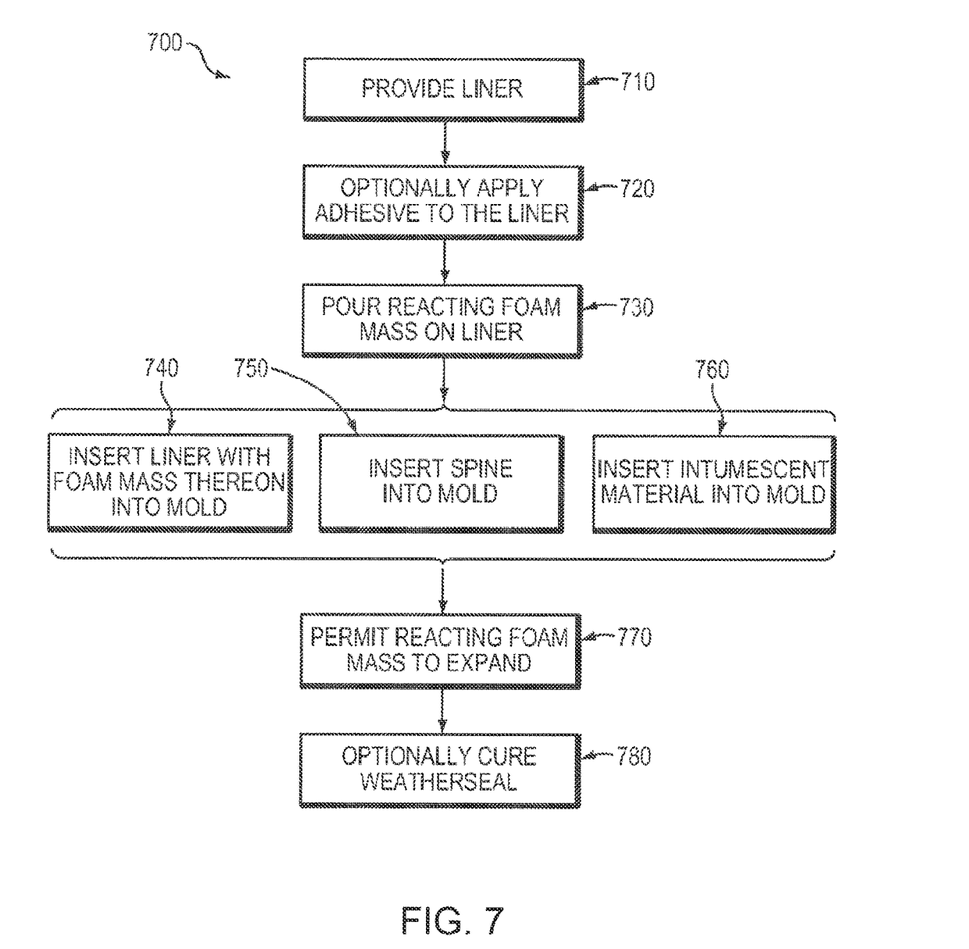
FIG. 7 is a block diagram of a process for forming a composite weatherseal, in accordance with one embodiment of the invention.

An example composite weatherseal formation process 700 is shown in FIG. 7. As described above, the process may, for example, be a continual molding process combining a foam core with a harder spine or foot section all sheathed with a low friction polyethylene exterior liner. The continual molding process can use folder tooling to position and guide all components together, prior to feeding into a profiled mold section. In addition, the required tooling may include a guide to insert one or more strips of intumescent material in the appropriate location and orientation, which is held in place by the expanded polyurethane foam core.

In one embodiment, the process involves providing a liner 710 and, in one embodiment, supplying an adhesive 720 to the liner to aid in bonding the liner with at least one of the spine, the foam mass, and the intumescent strip. In an alternative embodiment, no adhesive is required, or the foam mass includes an adhesive that binds at least one of the liner, the spine, and the intumescent material thereto. The process next involves mixing and dispensing a reacting foam mass on to the liner 730 and sequentially or concurrently inserting the liner with foam mass thereon into a mold 740, inserting the spine into the mold 750, and inserting the intumescent material into the mold 760. The liner, spine, and intumescent material are then held in the mold 770 for a time sufficient for the reacting foam mass to expand, with the expansion of the foam constrained by the mold to shape the weatherseal. In one embodiment, the resulting weatherseal is substantially V-shaped, although any appropriate shape of weatherseal may be produced by the methods described herein. The process may, in one embodiment, also include curing the reacting foam mass 780 to stop expansion of the reacting foam mass.

The quantity of intumescent contained in the resulting seal may, for example, be the amount needed for 30 minute fire rated doors. Such doors are normally in PVC carriers that carry a fire loading and are resistive to intumescent expansion. As a result, the intumescent seals described herein will, in certain embodiments, perform better than similar standard seals in such non-intumescently expanding doors.

In addition, the processes described herein allow for the insertion of commercially available intumescent strip into the foam core of a standard cold smoke seal to produce a combined cold smoke seal/intumescent seal. This provides an advantage over prior art fire doors by allowing a single seal to provide the functionality of two prior art seals to produce a high quality smoke/weatherseal with a hot seal.

In another embodiment, fabrication could be achieved using a die process. Specifically, a shaped die can be provided through which the liner, insert, foam and intumescent strip are pulled. In this embodiment, a side of the liner proximate the insert, foam and strip can be coated with an adhesive that maintains the sealing profile in the shape formed by the die, similar to what is described in the '586 patent referenced above.

Figure 4A:
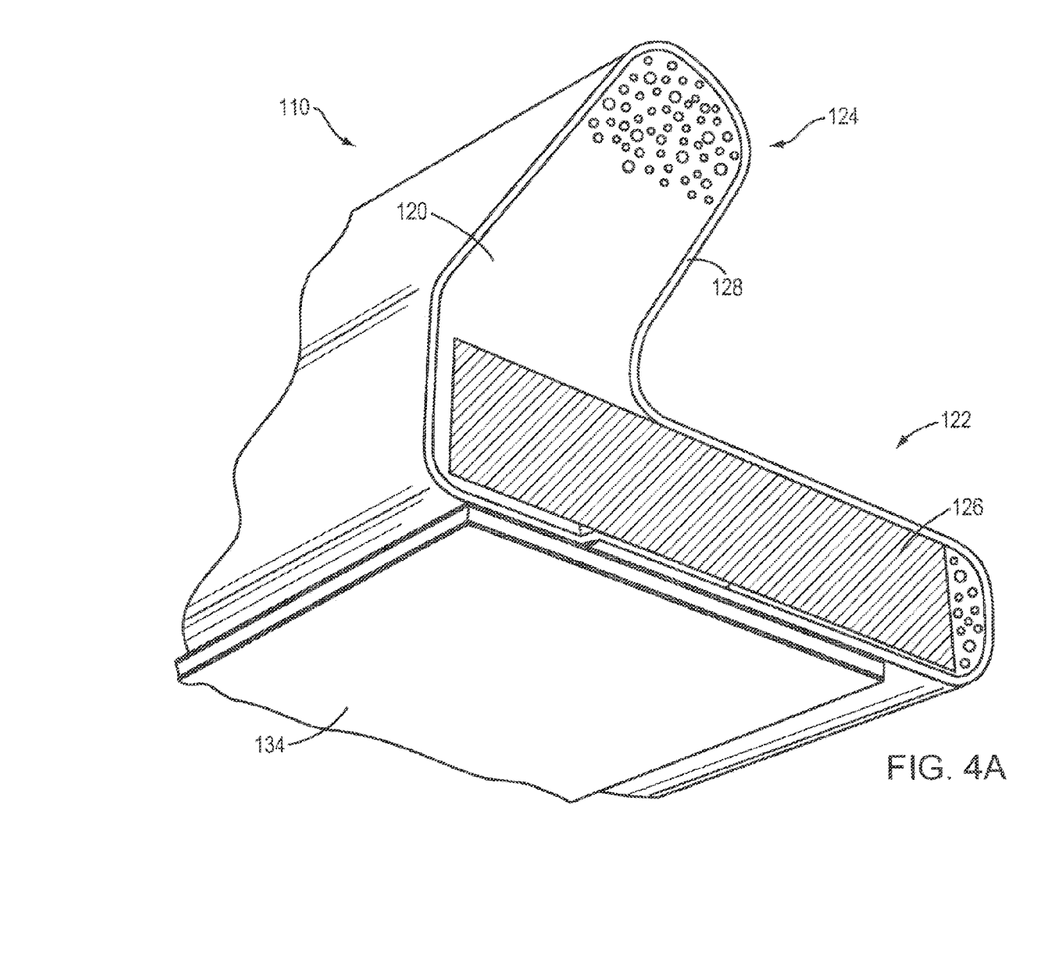
FIG. 4A is a perspective view of a weatherseal according to another embodiment of the invention.
Figure 4B:
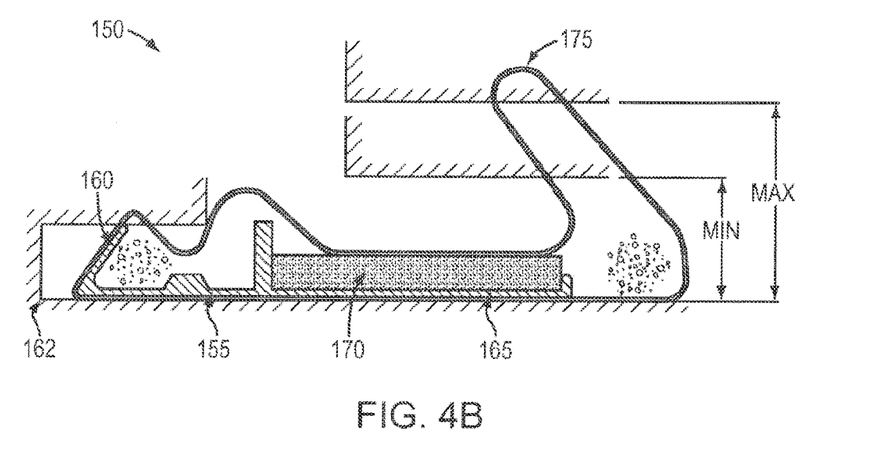
FIG. 4B is a side view of a weatherseal having an intumescent material extending along at least a section of the base portion according to another embodiment of the invention.
Figure 4C:
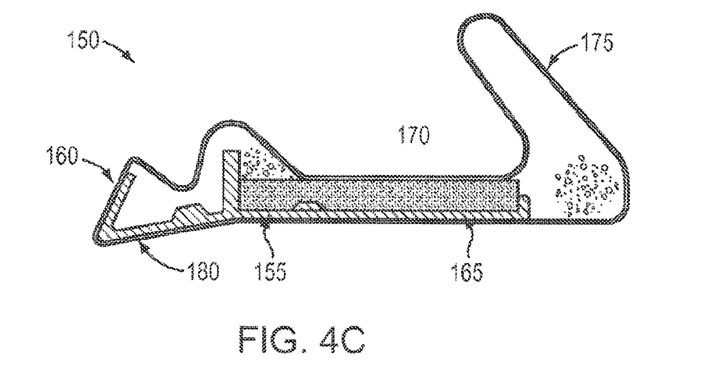
FIG. 4C is a side view of the weatherseal of FIG. 4B with a base portion having an angled section.

The geometry of the weatherseal depends upon the application, and weatherseals according to the invention can be made of sizes required for any application. That is, weatherseals according to the invention can be fabricated in many sizes and shapes, for use in connection with many different closures. For example, FIGS. 4A-4C illustrates another seal 110 similar to the weatherseal 10 illustrated in FIGS. 1-3, but that does not include the spine or flexible fins. In FIG. 4A, the weatherseal 110 has a foam core 120 that is generally V-shaped, having a sealing leg 122 and a support leg 124. The intumescent material 126 is disposed in the support leg 124, and a liner 128 is formed about the foam core 120 and intumescent material 126. The weatherseal 110 functions similar to the weatherseal 10, described above, but is applied in a slightly different manner. Specifically, instead of including a spine and flexible fins that are inserted into a kerf, the seal includes an adhesive strip 134, applied to the support leg 122. The adhesive strip 134 can include a backing strip that is removed to expose an adhesive used to attach the weatherseal to a frame.

The weatherseal 110 shown in FIG. 4A can be made in substantially the same manner as the weatherseal 10, although without the need to introduce the spine into the mold. The adhesive strip 134 can be applied using known methods. In the illustrated embodiment, the adhesive strip 134 is applied after the liner 128 is wrapped around the foam core 120 and intumescent material 126, and is formed over a seam created at overlapping edges of the liner 128. Alternatively, the adhesive strip 134 could be applied to the liner prior to formation of the seal. In this embodiment, the adhesive strip 134 can be precisely placed, to ensure its position on the support leg 126 when the foam cures.

FIGS. 4B and 4C shown another weatherseal 150 having a spine 155 with a flexible fin 160 extending from one end thereof for engaging a kerf 162 cut in a door or window frame. The spine 155 includes a base portion 165 from which the flexible fin 160 extends, with an intumescent material 170 extending along at least a section of the base portion 165. A sealing leg 175 extends from the end of the base portion to engage the moving portion of a door or window when the seal is used. The sealing leg 175 may engage structures of any appropriate distance from the base portion 165 within a range defined between a minimum and maximum distance. In an alternative embodiment, the sealing leg 175 holds intumescent material in addition to, or in place of, the base portion 165. In a further alternative embodiment, a plurality of flexible fins 160 may extend from the base portion 165, as described herein. In the embodiment of FIG. 4C, the base portion 165 includes an angled section 180.

Figure 5A:
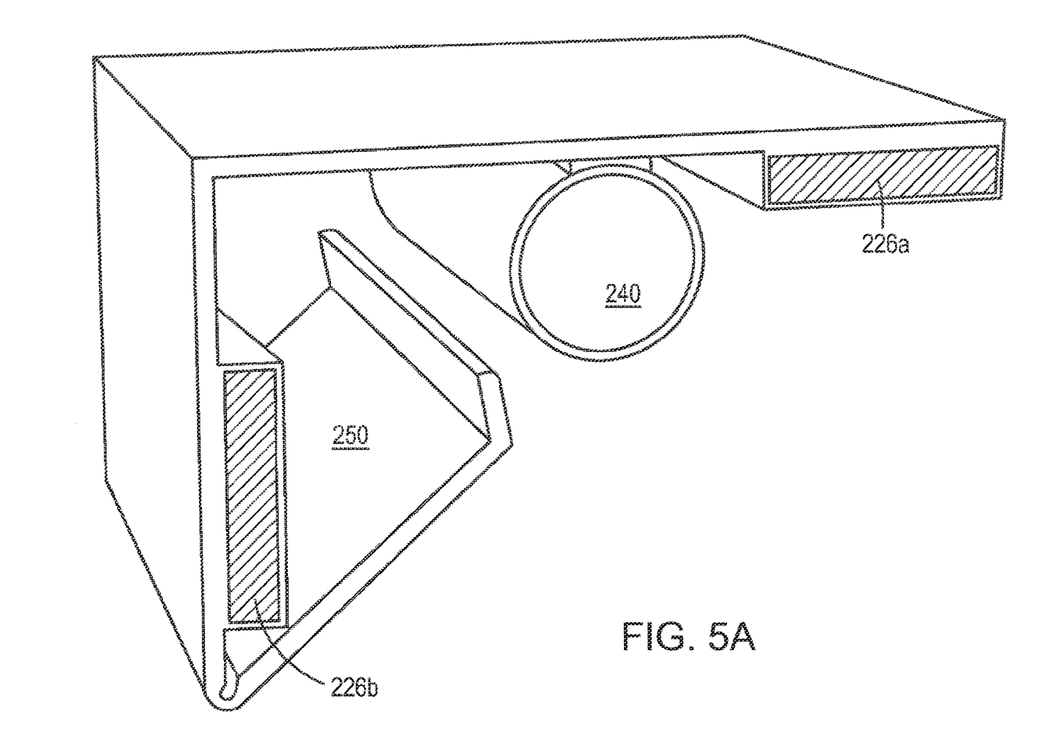
FIG. 5A is a perspective view of a weatherseal according to another embodiment of the invention.
Figure 5B:
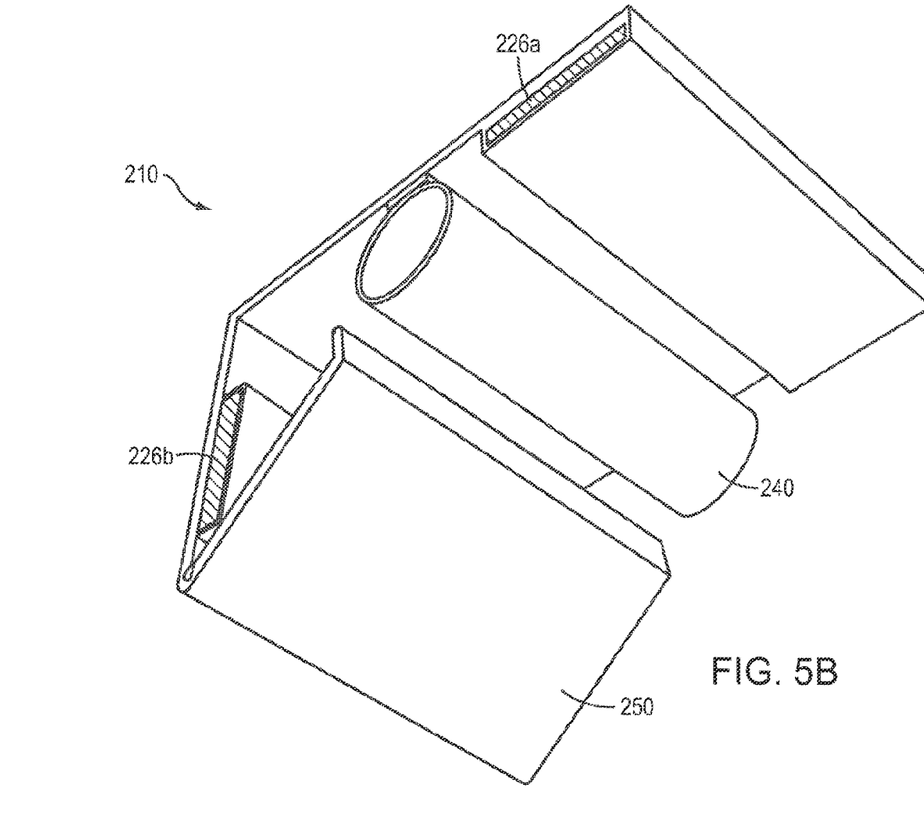
FIG. 5B is a different perspective view of the weatherseal illustrated in FIG. 5A.

Although the embodiments described above include a foam core, the invention is not limited to foam-based products. Extruded weatherseals also can be formed using the invention. For example, FIGS. 5A and 5B show different perspectives of an extruded weatherseal 210 with a hollow bulb 240 and a secondary sealing flap 250. In the illustrated embodiment, two strips of intumescent material 226a, 226b are encapsulated by the extruded material. The weatherseal of FIGS. 5A and 5B allows for two planes of the closure to be sealed by the intumescent material, when activated. Specifically, when the seal is applied to the closure, the first intumescent strip 226a is arranged along the jamb surface of the closure and the second intumescent strip 226b is arranged along the closure slab. The bulb 240 is not limited to being hollow and can be made of various materials. The seal 210 could have any of the other features shown in the foregoing embodiments, including a weakened portion proximate the intumescent material. In an alternative embodiment, the weatherseal 210 could include only one intumescent material.

Figure 6:
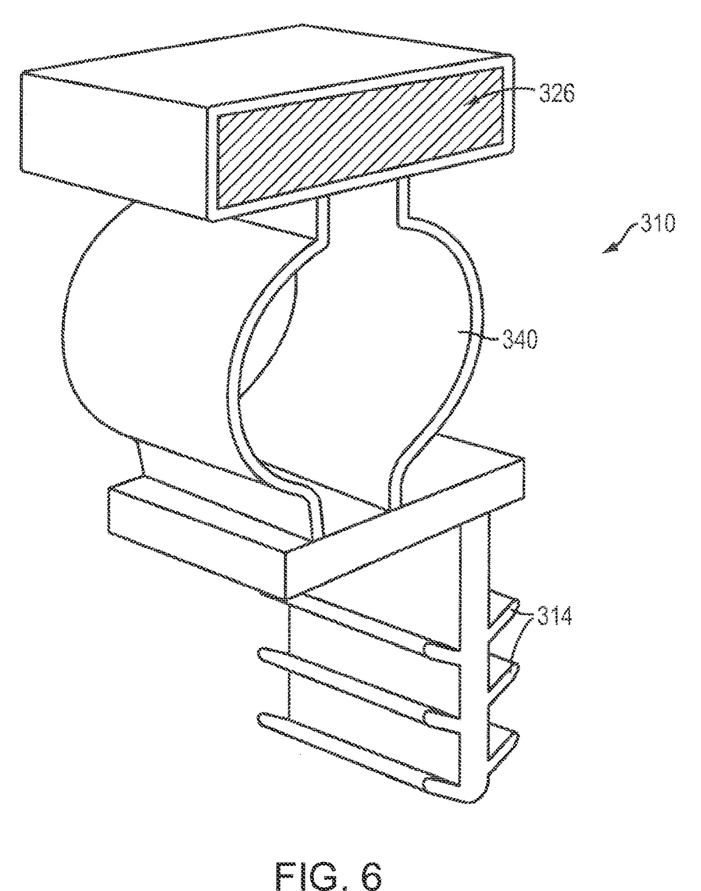
FIG. 6 is a perspective view of a weatherseal according to another embodiment of the invention.

Another extruded weatherseal 310 is shown in FIG. 6. This seal 310 has intumescent material 326 encapsulated by the extruded material, and spaced from flexible fins 314 by a hollow bulb 340. Again, this weatherseal 310 could include a weakened portion proximate the intumescent material 326, or the extruded material could merely melt in excessive heat. As in the first embodiment, the flexible fins 314 can be inserted into a kerf to secure the seal 310 relative to the closure.

The extruded weather seals 210, 310 can be formed by extruding around the intumescent material. It has been discovered that the intumescent material may be extruded at a high enough speed such that the material does not intumesce during extrusion when temporarily subjected is the molten extrudate. Specifically, the inventors have fabricated an extruded weatherseal by extruding TPE about an intumescent material strip. Other extrudable materials, including, but not limited to, TPE could alternatively be used such as PVC, urethanes, TPV, styrenic thermoplastic elastomers and EVA. The rate of extrusion could also be varied, depending on the materials used, to ensure that the material does not intumesce appreciably or at all.

In one example, testing has demonstrated the capability to slip coat the intumescent strip using a extrusion die, by passing the intumescent strip through an extrusion die at a rate of about 75 feet per minute or greater, in order to keep the intumescent strip from intumescing. The extruder barrel and die heats are set in a range of about 350 degrees Fahrenheit to about 450 degrees Fahrenheit, depending on the material being used for the slip coat. Testing has also demonstrated the ability to cross head the extrusion die, so that different components of the weatherseal can be reliably manufactured with different durometer materials, such as a ridged leg with flexible fins, and a flexible or rigid slip coat. In various embodiments, the slip coat can have a thickness in a range of about 0.010 inches to about 0.040 inches or, preferably, about 0.020 inches to about 0.030 inches.

Thus, the present invention provides a unitary weatherseal with integrated intumescent material. The weatherseal is easily installed by the user and has proven sealing properties. The invention can be applied to other shapes and configurations, as well. Moreover, although the seal may be designed with fins or the like for insertion into a kerf, the seal could alternatively be affixed to the frame of the enclosure using other methods, such as an adhesive tape or fasteners disposed along the spine. In these alternative embodiments, the fins need not be included. In all instances, the various embodiments of weatherseals disclosed herein and that are within the level of skill in the art from the teachings herein may be considered drop-in replacements for non-intumescent weatherseals. Accordingly, whether for new applications or retrofit applications, the substitution of the weatherseals according to the invention provide all of the advantages of intumescent weatherseals, without the need to reconfigure or redesign the fenestration or complicate the weatherseal installation. Further, there is no need to provide and install, in combination, both a weatherseal and a separate intumescent material seal in side-by-side or stacked relation in the same location. Weatherseals according to the invention have relatively large sealing surfaces, making them ideal for conventional sealing against passage of rain, drafts, and cold smoke conditions, as well as for emergency sealing against fire and hot gas and smoke conditions.

The foregoing embodiments of the invention are representative embodiments, and are provided only for illustrative purposes. The embodiments are not intended to limit the scope of the invention. Variations and modifications are apparent from a reading of the preceding description and are included within the scope of the invention. The invention is intended to be limited only by the scope of the accompanying claims.

What is claimed is:

1. A method of forming a composite weatherseal comprising:
   providing a liner;
   pouring a reacting foam mass on to the liner;
   inserting the liner with foam mass thereon into a mold;
   concurrent with inserting the liner into the mold, inserting a spine into the mold and inserting an intumescent material into the mold; and
   maintaining the liner with foam mass thereon, the spine, and the intumescent material in the mold for a time sufficient for the reacting foam mass to expand,
   wherein the intumescent material is arranged at an outer surface of the foam mass, between the foam mass and the liner, such that at least a portion of the intumescent material is in contact with the liner.

2. The method of claim 1, wherein the expansion of the foam is constrained by the mold to shape the weatherseal.

3. The method of claim 1, further comprising supplying an adhesive to the liner to aid in bonding the liner with at least one of the spine, the foam mass, and the intumescent material.

4. The method of claim 1, wherein the weatherseal is substantially V-shaped.

5. The method of claim 1, wherein the foam mass includes an adhesive that binds at least one of the liner, the spine, and the intumescent material thereto.

6. The method of claim 1, further comprising a curing step of curing the reacting foam mass to stop expansion of the reacting foam mass.

* * * * *